United States Patent
Headlee et al.

(10) Patent No.: US 7,017,979 B1
(45) Date of Patent: Mar. 28, 2006

(54) DOOR OPENING APPARATUS FOR A STORAGE COMPARTMENT DOOR

(75) Inventors: William R. Headlee, Fort Wayne, IN (US); Andrew B. Ewing, New Haven, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/995,697

(22) Filed: Nov. 23, 2004

(51) Int. Cl.
*B60J 5/06* (2006.01)

(52) U.S. Cl. ............... 296/190.11; 296/155; 49/213

(58) Field of Classification Search ........... 296/190.11, 296/155, 106, 50, 146.1; 49/209, 211, 213
See application file for complete search history.

(56) References Cited

U.S. PATENT DOCUMENTS

| | | | | |
|---|---|---|---|---|
| 1,913,726 A | * | 6/1933 | Sevison | 49/209 |
| 2,841,441 A | * | 7/1958 | Evans | 296/117 |
| 3,398,985 A | * | 8/1968 | Rhoades | 296/57.1 |
| 4,432,164 A | * | 2/1984 | Baguet | 49/209 |
| 4,561,690 A | * | 12/1985 | Shinjo et al. | 296/155 |
| 5,688,019 A | * | 11/1997 | Townsend | 296/155 |
| 5,921,611 A | * | 7/1999 | Townsend | 296/155 |
| 5,992,918 A | * | 11/1999 | Gobart et al. | 296/146.13 |
| 6,018,911 A | * | 2/2000 | Menegazzo | 49/213 |
| 6,276,744 B1 | * | 8/2001 | Huber et al. | 296/155 |
| 6,464,278 B1 | * | 10/2002 | Bailey | 296/57.1 |
| 6,477,806 B1 | * | 11/2002 | Asada et al. | 49/169 |

OTHER PUBLICATIONS

Concealed Door Stay Hinge by Southco, Inc., Part Nos. R6-22-11 and R6-22-23, Drawing No. J-R6-22-1.

* cited by examiner

*Primary Examiner*—D. Glenn Dayoan
*Assistant Examiner*—Greg Blankenship
(74) *Attorney, Agent, or Firm*—Jeffrey P. Calfa; Dennis Kelly Sullivan; Susan L. Lukasik

(57) ABSTRACT

The invention is a door opening apparatus for the outside door of a luggage or storage compartment of a large motor vehicle, such as a truck or bus. The door opening apparatus has at least one door guide and a guide roller. The door guide has tracks within a straight section and opposite first and second ends. Both tracks have a detent located within the second end of the door guide. The upper track also has a hook with a stop located within the first end of the door guide. Rollers connected to the fingers of the guide roller engage the tracks of the door guide to allow the door to move from an open to a closed position.

12 Claims, 3 Drawing Sheets

DOOR OPENING APPARATUS FOR A STORAGE COMPARTMENT DOOR

BACKGROUND OF THE INVENTION

1. Field of the Invention

The present invention relates to a door opening apparatus for the storage compartment of a large motor vehicle, such as a truck or a bus.

2. Description of the Prior Art

In a large truck, a cab with a sleeper has a storage compartment for luggage and the like which is accessed through an outside door. The outside door must open with more than a $90^N$ rotation to provide efficient and easy access to the storage compartment without requiring the operator to bend or hunch over. The door must also remain open without the operator holding or supporting the door. Furthermore, the outside door must open without a handle to maintain the clean lines of the truck cab.

Currently, piano hinges or J-type hinges with or without prop rods are used to open and hold open the door. These types of hinges eat up the little valuable storage space available in the storage compartment of a modern streamlined designed truck. Furthermore, these hinges require the door to swing wide open away from the cab.

Therefore, one object of the invention is for an apparatus that opens and holds the door open while keeping the door close to the sleeper wall. Another object of the invention is for an apparatus that allows improved access to the luggage compartment in the open position and avoids forcing the operator to stoop or bend when retrieving items from the compartment. Another object of the invention is to positively position the door at the top.

SUMMARY OF THE INVENTION

According to the invention there is provided a door opening apparatus for the outside door of a luggage or storage compartment of a large motor vehicle. The door opening apparatus has at least one door guide and a guide roller. The door guide has a straight section and opposite first and second ends.

Upper and lower tracks are located within the door guide. The upper track has an upper detent located within the second end of the door guide. The upper track also has a hook with a stop located within the first end of the door guide. The lower track has a lower detent located within second end of the door guide.

The guide roller has a base from which two fingers extend. A roller is located at the end of each finger. An upper roller rotatingly connects to a distal end of the first finger and engages the upper track of the door guide. A lower roller rotatingly connects to a distal end of the second finger and engages the lower track of the door guide.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
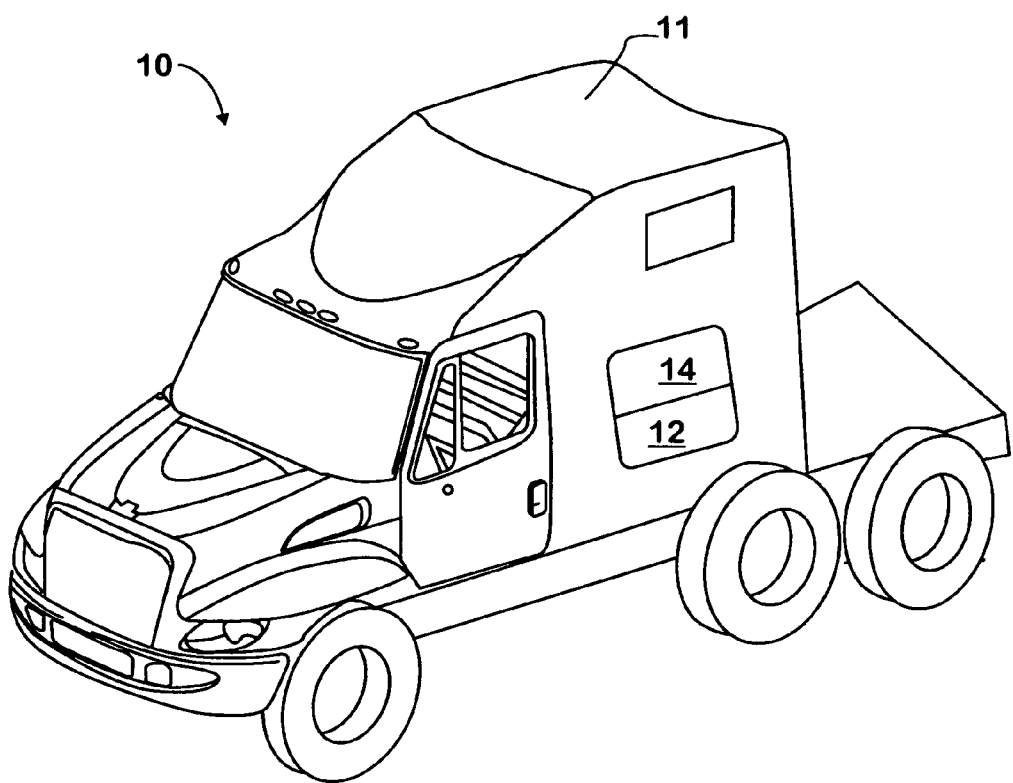
FIG. 1 is a perspective view of a large vehicle of the invention with the outside storage door in the fully open position.
Figure 2:
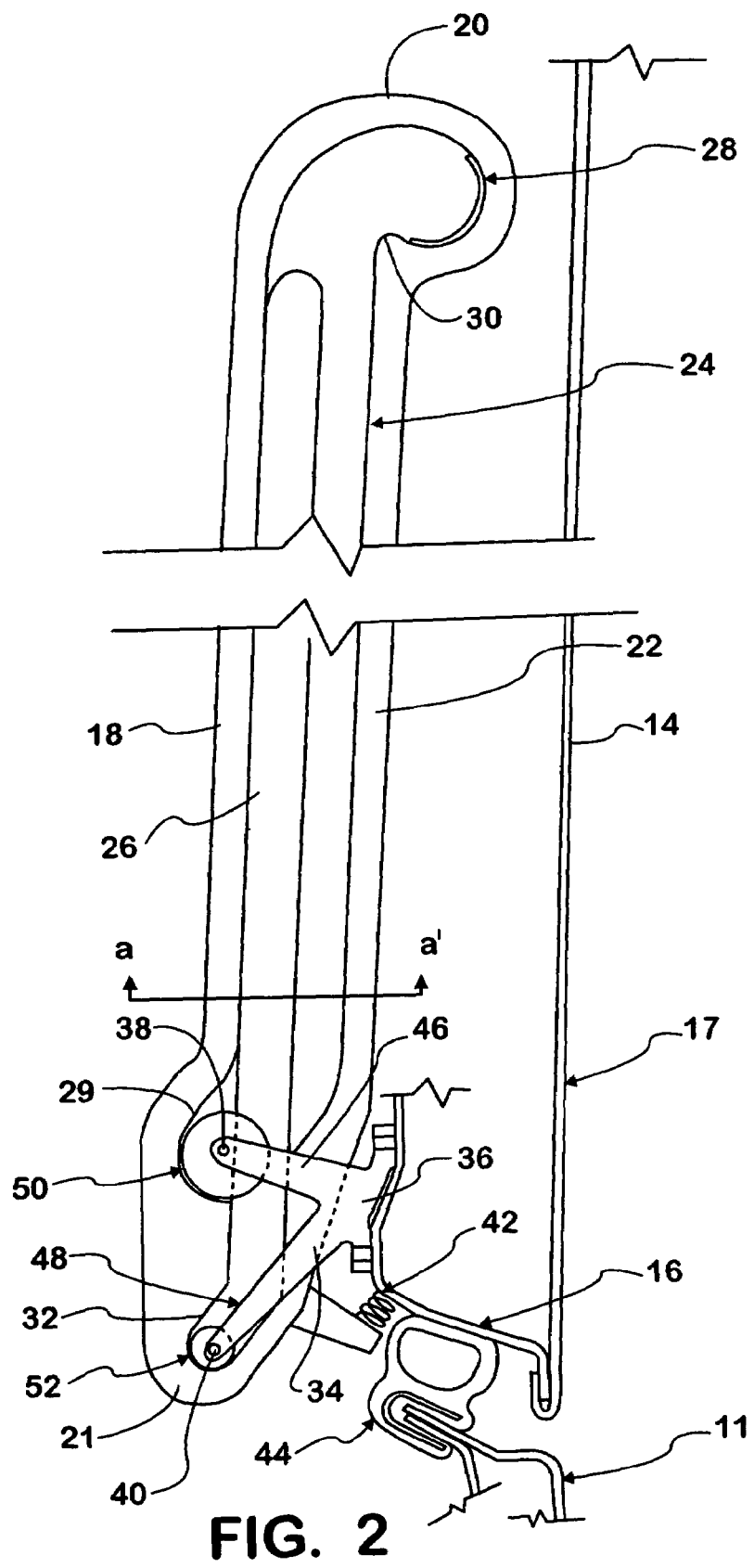
FIG. 2 is a partial front view of an outside door opening apparatus of the invention when the door is closed.

Turning to the Figures where like reference numerals refer to like structures, a large motor vehicle, such as a truck 10 or bus, has a luggage or storage compartment 12 located within a cab 11. The storage compartment 12 has inner cab walls 13, and a door opening 15.

An outside door 14 allows access into the storage compartment 12 when open. When closed, the outside door 14 fits within the door opening 15 to close the storage compartment 12 to the outside. The outside door 14 has inner 16 and outer 17 skins.

The storage compartment 12 has at least one door guide 18 located within and attached to the inner cab wall 13 of the storage compartment 12. The storage compartment preferably has two door guides 18, each one attaching to the inner cab wall 13 at the left and right sides of the storage compartment 12. The door guide 18 has opposite first 20 and second 21 ends with a straight section 22 between the first and second ends 20, 21, and upper 24 and lower 26 tracks. The first end 20 curves from the straight section 22 toward the outside door 14. The second end 21 curves or slants away from the outside door 14. A spring 42 can be connected to the second end 21 of the door guide 18.

Figure 4:
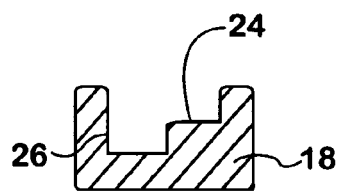
FIG. 4 is a cross-sectional view of a straight section of a door guide along line a–a' where the upper and lower tracks are adjacent to each other.
Figure 5:
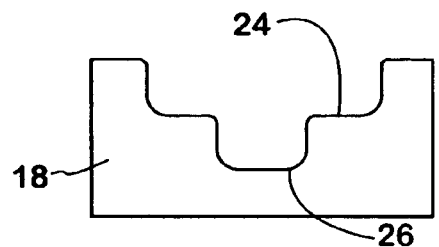
FIG. 5 is a cross-sectional view of a straight section of a door guide where the lower track is within the upper track.
Figure 3:
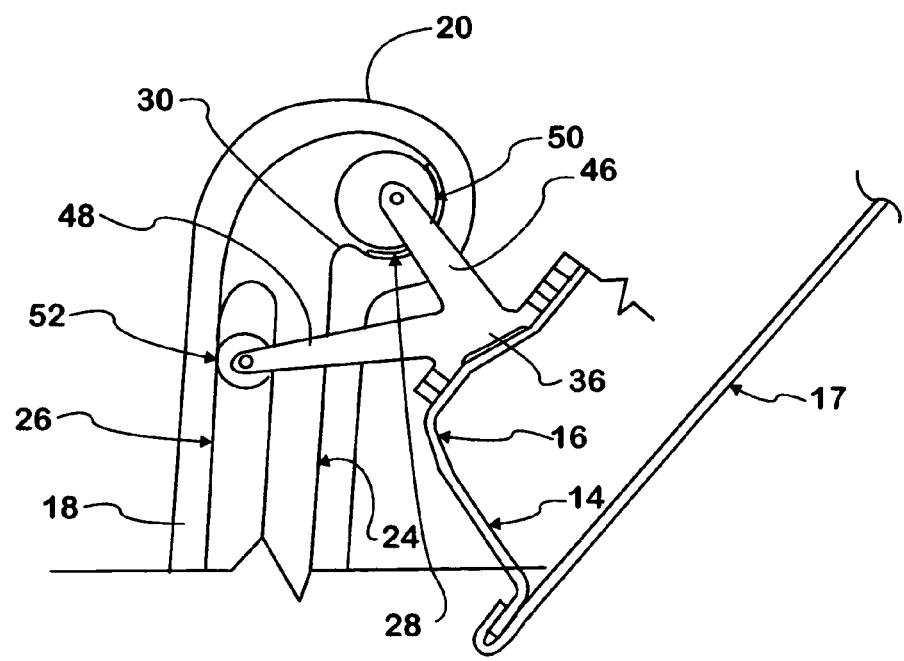
FIG. 3 is a partial front view of an outside door opening apparatus of the invention when the door is fully opened.

The upper track 24 is located within the door guide and is straight within the straight section 22 and curves at both the first 20 and second 21 ends of the door guide 18. The lower track 26 can be located laterally or adjacent to the upper track 24 (FIG. 4). Alternatively, the lower track 26 can be located within the upper track 24 (FIG. 5).

The upper 24 and lower 26 tracks have curved and straight sections corresponding to the configuration of the door guide 18. At the first end 20 of the door guide 18, the top section of the upper track 24 hooks from the straight section 22 toward the door 14 and curves slightly downward to form a hook 28 with a stop 30. At the second end 21 of the door guide 18, the bottom section of upper track 24 curves away from the door forming an upper detent 29.

The top of the lower track 26 preferably remains uncurved and within the straight section 22 of the door guide 18. The bottom section of the lower track 26 curves away from the door 14 at the second end 21 of the door guide 18 forming a lower detent 32.

A guide roller 34 engages the upper and lower tracks 24, 26 of the door guide 18. The guide roller 34 has a base 36 which mounts to the inner skin 16 of the door 14, such as by fastening, welding, annealing or adhesion. The base 36, therefore, should abut the inner skin 16 of the door 14.

First 46 and second 48 fingers extend from the base 36, preferably at an acute angle to one another. The second finger 48 is located either laterally to or behind the first finger 46, depending on the configuration of the upper and lower tracks 24, 26. An upper roller 50 or wheel rotationally engages the distal end 54 of the first finger 46, such as with a pin 38 extending through the distal end 54 of the first finger 46 and the center of the upper roller 50 or a pin extending between a forked distal end of the first finger. The upper roller 50 rolls within the upper track 24 from the upper detent 29 to the hook 28. The stop 30 locks the upper roller 50 within the hook 28 when the outside door 14 is in the fully open position.

A lower roller 52 or wheel rolls within the length of the lower track 26 from the lower detent 32. The lower roller 52 rotationally engages the distal end 56 of the second finger 48, such as with a pin 40 extending through the distal end 56 of the second finger 48 and the center of the lower roller 26 or a pin extending between a forked distal end of the second finger.

During use, the door opening apparatus is easy to use. When the door is closed, the upper roller 50 rests within the upper detent 29 and the lower roller 52 rests within the lower detent 32. To open the outside door 14, the operator releases a remote latch on the door to partially open the door. This action releases a spring 42. The spring 42 pushes the lower edge of the door upward and outward which in turn moves the guide roller's 34 upper roller 50 and lower roller 52 out of the detents 29, 32.

At this point an opening exists between the door and the cab, allowing the operator to grab the bottom of the door and push the door upward. The upper roller 50 rolls within the upper track 24, while the lower roller 52 rolls within the lower track 26 as the door moves.

When the door is fully open, the upper roller 24 enters into the hook 28 where the upper roller 24 rests. The stop 30 prevents the upper roller 24 from accidentally disengaging from the hook 28 when the door is fully open.

To close the door, the operator pushes the door inward. This action pushes the upper roller 24 over the stop 20 and from the hook 28. The guide roller 34 can now slide downward along the door guide 18 under the force of gravity until reaching the detents 29, 32. The operator now pushes the door inward to force the upper roller 50 into the upper detent 29 and the lower roller 52 into the lower detent 32. At this point the spring 42 is compressed, the door 14 engages the bulb seal 44 attached to the cab 11 and the door latches.

The outside storage door opening apparatus of the invention has a number of advantages. The apparatus easily opens and holds the door open while keeping the door close to the cab wall while opening without requiring the door to rotate open. Another advantage is that the apparatus that allows improved access to the luggage compartment in the open position and avoids forcing the operator to stoop or bend when retrieving items from the compartment. The apparatus also allows the door to open up.

While the invention is shown in only one of its forms, it is not thus limited but is susceptible to various changes and modifications without departing from the spirit and scope of the invention.

What is claimed is:

1. A door opening apparatus for an outside door of a storage compartment of a large motor vehicle, comprising:
   at least one door guide having opposite first and second ends, and a straight section between the first and second ends;
   an upper track having an upper detent being located within the second end of the door guide, and a hook with a stop being located within the first end of the door guide;
   a lower track having a lower detent being located within the second end of the door guide;
   a guide roller having a base, and first and second fingers extending from the base;
   an upper roller rotatingly connecting to a distal end of the first finger and engaging the upper track; and
   a lower roller rotatingly connecting to a distal end of the second finger and engaging the lower track.

2. The door opening apparatus of claim 1, wherein the first and second fingers extend from the base at an acute angle to one another.

3. The door opening apparatus of claim 2, wherein the stop locks the upper roller within the hook when the upper roller is located within the hook.

4. The door opening apparatus of claim 3, wherein the first end curves toward the outside door from the straight section and the second end curves away from the outside door from the straight section.

5. The door opening apparatus of claim 3, wherein the lower track is located adjacent to the upper track.

6. The door opening apparatus of claim 3, wherein the lower track is located within the upper track.

7. An apparatus for a large motor vehicle, comprising:
   a storage compartment within the large motor vehicle having an outside opening, and inner cab walls;
   at least one door guide attaching to one inner cab wall, the door guide having opposite first and second ends, and a straight section between the first and second ends;
   an upper track having an upper detent being located within the second end of the door guide, and a hook with a stop being located within the first end of the door guide;
   a lower track having a lower detent being located within the second end of the door guide;
   a guide roller having a base, and first and second fingers extending from the base;
   an upper roller rotatingly connecting to a distal end of the first finger and engaging the upper track;
   a lower roller rotatingly connecting to a distal end of the second finger and engaging the lower track; and
   an outside door attaching to the base of the guide roller and fitting within the outside opening of the storage compartment when in a closed position.

8. The apparatus of claim 7, wherein the first and second fingers extend from the base at an acute angle to one another.

9. The apparatus of claim 8, wherein the stop locks the upper roller in the hook when the outside door is a fully open position.

10. The apparatus of claim 9, wherein the first end curves toward the outside door and the second end curves away from the outside door.

11. The apparatus of claim 9, wherein the lower track is located adjacent to the upper track.

12. The apparatus of claim 9, wherein the lower track is located within the upper track.

* * * * *